United States Patent
McNiece (10) Patent No.: US 10,326,718 B2
(45) Date of Patent: *Jun. 18, 2019

(54) APPARATUS AND METHOD FOR QUICKLY SENDING MESSAGES

(71) Applicant: Unify GmbH & Co. KG, Munich (DE)

(72) Inventor: Jeff McNiece, Atlantis, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,813

(22) Filed: Aug. 22, 2018

(65) Prior Publication Data
US 2018/0367481 A1 Dec. 20, 2018

Related U.S. Application Data

(63) Continuation of application No. 14/519,700, filed on Oct. 21, 2014, now Pat. No. 10,084,730.

(51) Int. Cl.
*H04L 12/58* (2006.01)

(52) U.S. Cl.
CPC ............. *H04L 51/04* (2013.01); *H04L 51/08* (2013.01); *H04L 51/16* (2013.01); *H04L 51/28* (2013.01)

(58) Field of Classification Search
CPC ......... H04L 51/04; H04L 51/08; H04L 51/16; H04L 51/28
USPC ........................................................ 709/206
See application file for complete search history.

(56) References Cited

U.S. PATENT DOCUMENTS

| | | |
|---|---|---|
| 6,687,741 B1 | 2/2004 | Ramaley et al. |
| 6,820,111 B1 | 11/2004 | Rubin et al. |
| 6,898,622 B1 | 5/2005 | Malik |
| 7,003,551 B2 | 2/2006 | Malik |
| 7,054,905 B1 | 5/2006 | Hanna et al. |

(Continued)

FOREIGN PATENT DOCUMENTS

| | | |
|---|---|---|
| DE | 69712250 T2 | 12/2002 |
| DE | 10346897 | 8/2004 |

(Continued)

OTHER PUBLICATIONS

Attachment Executive Version 3.0 'Online', Jul. 2001, Retrieved from Internet: URL:http://web.archive/org/web/20030301033209// madsolutions.com/documentation.htm>, retrieved on Sep. 15, 2004, pp. 1-39, XP002296525.

*Primary Examiner* — Minh Chau Nguyen
(74) *Attorney, Agent, or Firm* — Buchanan Ingersoll & Rooney PC (57) ABSTRACT

A communication apparatus is configured to provide for quickly sending a message to a recipient. For instance, embodiments can be configured so that text, an image, or other content can be copied from a received message and sent via use of a copy and send command to actuate the formation of a message for sending. After selecting such a command, a message may be formed in a format of a preselecting messaging protocol (e.g. instant messaging, text messaging, etc.) that includes the copied content. In some embodiments, the sending of the message having the copied content may occur automatically in a predefined messaging format to a predefined addressee or group of predefined addressees after selecting a copy and send command so that no further input from a user is needed to effect the generation and sending of a message to the addressee(s).

20 Claims, 4 Drawing Sheets

(56) References Cited

U.S. PATENT DOCUMENTS

| | | |
|---|---|---|
| 7,113,948 B2 | 9/2006 | Jhingan et al. |
| 7,194,514 B1 | 3/2007 | Yen et al. |
| 7,213,206 B2 | 5/2007 | Fogg |
| 7,232,949 B2 | 6/2007 | Hruska et al. |
| 7,606,865 B2 | 10/2009 | Kumar et al. |
| 8,051,131 B2 | 11/2011 | Parry et al. |
| 8,775,542 B2 | 7/2014 | Lederer et al. |
| 9,002,965 B1 * | 4/2015 | Muthukrishnan ....... G06F 9/546 709/200 |
| 2001/0054073 A1 | 12/2001 | Ruppert et al. |
| 2002/0013817 A1 | 1/2002 | Collins et al. |
| 2002/0026818 A1 | 3/2002 | Bagusche |
| 2002/0059384 A1 | 5/2002 | Kaars |
| 2002/0091570 A1 | 7/2002 | Sakagawa |
| 2002/0103873 A1 | 8/2002 | Ramanathan |
| 2003/0055907 A1 | 3/2003 | Stiers |
| 2003/0115273 A1 | 6/2003 | Delia et al. |
| 2003/0131062 A1 | 7/2003 | Miyashita |
| 2004/0073616 A1 | 4/2004 | Fellenstein et al. |
| 2004/0158607 A1 | 8/2004 | Coppinger et al. |
| 2004/0257346 A1 | 12/2004 | Ong et al. |
| 2004/0260973 A1 * | 12/2004 | Michelman ......... G06F 11/1458 714/13 |
| 2005/0076111 A1 | 4/2005 | Cherkasova et al. |
| 2005/0086304 A1 | 4/2005 | Naick et al. |
| 2006/0155808 A1 | 7/2006 | Irlam et al. |
| 2008/0046845 A1 | 2/2008 | Chandra |
| 2008/0294726 A1 | 11/2008 | Sidman |
| 2009/0300139 A1 | 12/2009 | Shoemaker et al. |
| 2010/0191624 A1 * | 7/2010 | Sharir ................. G06F 17/3089 705/30 |
| 2012/0033241 A1 | 2/2012 | Park et al. |
| 2013/0275525 A1 | 10/2013 | Molina et al. |
| 2014/0057610 A1 * | 2/2014 | Olincy .................... H04W 4/16 455/414.1 |

FOREIGN PATENT DOCUMENTS

| | | |
|---|---|---|
| EP | 1289210 A2 | 3/2003 |
| EP | 2544437 A1 | 1/2013 |
| EP | 2584770 A1 | 4/2013 |
| EP | 2731320 A2 | 5/2014 |
| JP | 2001344178 A | 12/2001 |
| WO | 0248900 A2 | 6/2002 |

\* cited by examiner

APPARATUS AND METHOD FOR QUICKLY SENDING MESSAGES

CROSS-REFERENCE TO RELATED APPLICATIONS

This application is a continuation application of U.S. patent application Ser. No. 14/519,700, which was filed on Oct. 21, 2014.

FIELD

The present innovation relates to an apparatus and method for quickly sending messages from one communication device to one or more other communication devices. For instance, some embodiments of the innovation can be configured as a communication system. As another example, embodiments of the innovation may be implemented in a mobile communication terminal or other type of communication device.

BACKGROUND

Messages between communication devices may be exchanges via email, text messages sent via short message service ("SMS"), or other types of messaging formats. For instance, email message recipients can utilize an email application running on a communication device to reply to a received email message that replies to a sender of that email. A forwarding of the email message to another sender can also be actuated by actuation of different indicia. Typically, forwarding of an email message requires an actuation of forwarding command indicia (e.g. a forward button displayed on a user interface of the email application running on a device) and subsequently entering address information for the recipient of this email. Thereafter, the forwarded email can be sent by actuation of send indicia (e.g. selection of a send button displayed on a user interface of the email application running on a device). The forwarding of messages can be time consuming to users as it can require actuation of multiple different selectable indicia or the entrance of multiple different commands.

SUMMARY

A method of quickly sending at least one message is provided that includes the steps of selecting content data displayed on a display unit, actuating a copy and send command after selecting the content data, generating, by a first communication terminal, a message in a pre-selected messaging format having the content data copied within the message in response to actuation of the copy and send command, and sending, by the first communication terminal, the message.

Embodiments of the method can be configured such that the message is sent to a messaging support node for delivery to at least one addressee of the message. Embodiments of the method can also include the steps of delivering the message, by the messaging support node, to a second communication terminal associated with an addressee of the message, and sending authentication data from the second communication terminal to the messaging support node. The messaging support node can send the message to the second communication terminal after receiving the authentication data and verifying that the authentication data associates the second communication terminal with the addressee of the message.

In some embodiments of the method, the message can be generated such that the message is automatically addressed to a pre-selected addressee by the first communication terminal in response to actuation of the copy and send command. The pre-selected messaging format of the message can be defined by a graphical user interface from which the content data is selected and the message can be automatically sent by the first communication terminal in response to the actuation of the copy and send command. The pre-selected addressee for the message can be an address of at least one user associated with an open conversation display within the graphical user interface of the first communication terminal displaying the selected content data via the display unit. The content data can comprise at least one of text, graphical data, a uniform resource locator, audio data and video data.

A communication system is also provided. Embodiments of the communication system can include a first communication terminal having hardware comprising at least one processor communicatively connected to non-transitory memory and a messaging support node having hardware comprising at least one processor communicatively connected to non-transitory memory. The messaging support node can be communicatively connectable to the first communication terminal. The first communication terminal can be configured to select content data displayed on a display unit. The first communication terminal can be configured to generate a message in a pre-selected messaging format having the selected content data copied within the message in response to actuation of a copy and send command. The first communication terminal can be configured to send the message in a pre-selected messaging format to the messaging support node for delivery of the message to at least one second communication terminal associated with at least one addressee of the message.

In some embodiments of the system, the content data comprises at least one of text, audio data, video data, a uniform resource locator, a link to a website, image data, and graphical data.

In some embodiments, the messaging support node can be configured to deliver the message to each second communication terminal associated with a respective addressee of the message in response to receiving authentication data from the second communication terminal that authenticates the second communication terminal. Embodiments of the messaging support node can include, for example, server computer devices, work stations, and other computer devices configured to support the messaging between users of different communication terminals that are using the terminals for engaging in communication sessions involving the exchange of text data, audio data, image data, video data and/or other type of data between the terminals.

Embodiments of the system can also include at least one second communication terminal. Each second communication terminal can be configured to send the authentication data to the messaging support node. The authentication data can comprise a password of an addressee of the message for authentication of the second communication terminal for receiving the message from the messaging support node. The message can be generated such that the message is automatically addressed to a pre-selected addressee by the first communication terminal in response to actuation of the copy and send command. The pre-selected messaging format of the message can be defined by a graphical user interface or an open conversation from which the content data is selected. The first communication terminal can be configured to automatically send the message in response to the actuation of the copy and send command such that no further input is provided to the first communication terminal from the user after actuation of the copy and send command for sending of the message. The pre-selected addressee for the message can be an address of a user associated with the open conversation having an exchange of messages displayed within the graphical user interface displaying the selected content data via a display unit of the first communication terminal. The display unit can be a display device of the first communication terminal or is a display device communicatively connected to the first communication terminal.

A communication terminal is also provided. The communication terminal can include hardware comprising a processor communicatively connected to non-transitory memory and at least one transceiver unit. The memory can have an application stored thereon that defines a copy and send command such that the communication terminal is configured to send a message having copied content within the message in response to actuation of the copy and send command.

In some embodiments of the communication terminal, the communication terminal can be configured such that the communication terminal generates a message in a pre-selected messaging format having the content data selected for copying being copied within the message in response to actuation of the copy and send command. The communication terminal can send the message in the pre-selected messaging format to a messaging support node for delivery of the message to at least one other communication terminal associated with at least one addressee of the message. The pre-selected messaging format of the message can be defined by a graphical user interface from which the content data is selected for copying. The communication terminal can also be configured to automatically send the message in response to the actuation of the copy and send command. The addressee of the message is a pre-selected addressee associated with an open conversation within the graphical user interface displaying the selected content data via a display unit of the communication terminal. Embodiments of the communication terminal can include smart phones, electronic tablet devices, laptop computers, personal computers, and other types of electronic communication terminal devices.

Other details, objects, and advantages of the invention will become apparent as the following description of certain present preferred embodiments thereof and certain present preferred methods of practicing the same proceeds.

BRIEF DESCRIPTION OF THE FIGURES

Exemplary embodiments of a window covering and method of using the same are shown in the accompanying drawings. It should be appreciated that like reference numbers used in the drawings may identify like components.

DETAILED DESCRIPTION

Referring to FIGS. 1-4, a communication system can include a plurality of communication terminals that are able to form at least one communication session between the terminals via a communication path that may traverse a network 3. The communication terminals can be communication endpoints that are usable by a user to establish a communication session such as a telephone call, the sending of a text message, an instant message chat session, or other type of communication session. Examples of communication terminals can include, for example, mobile communication terminals, personal computers, mobile phones, smart phones, electronic tablets, internet appliances, telephones, laptop computers, and other types of electronic communication terminals that include hardware such as a processor connected to memory for running applications stored in the memory and at least one transceiver unit for establishing communication links with one or more other devices.

Figure 1:
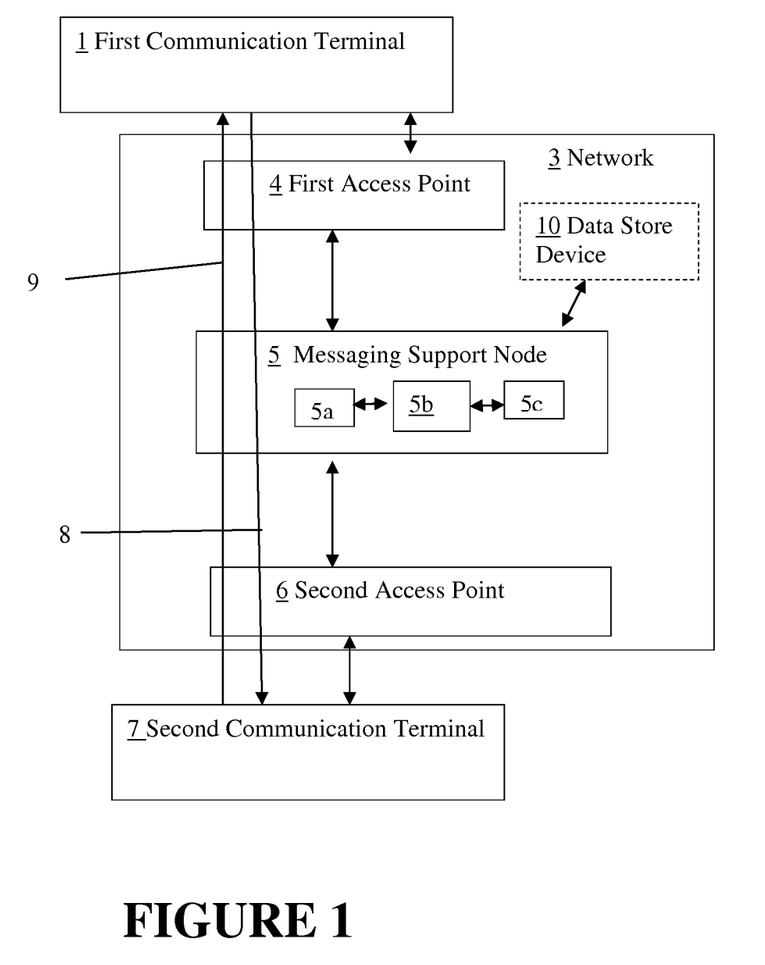
FIG. 1 is a block diagram illustrating a first exemplary embodiment of a communication system.

In some embodiments the communication terminals can include a first communication terminal 1 and a second communication terminal 7. The first communication terminal may be communicatively connected to a network 3 via a first access point 4, which may be a base station, a router, a cell tower, or other type of access point. The second communication terminal 7 can be communicatively connected to the network 3 via a second access point 6, which may be a base station, a cell tower, a router, or other type of access point.

The network 3 may be a wide area network, a local area network, a cellular phone network, or other type of network. The communication connections between the respective communication terminals and the access points to which they are connected may be via a wired connection or a wireless connection. Communicative connections between different nodes of the network 3 or between communication terminals of the network can include communication paths that include wired path segments as well as wireless path segments and may also include multiple intermediate nodes as well.

The network 3 can also include a messaging support node 5 that is communicatively connectable to the first communication terminal 1 via communications passing along a route that includes the first access point 4. The messaging support node 5 can also be communicatively connected to the second communication terminal 7 via communications passing along a route that includes the second access point 6.

The messaging support node 5 may be a server computer system or other type of communication device support node that is configured to support messaging between communication terminals. For instance, the messaging support node can be configured as a server that hosts an email service, a server that host an instant messaging service, a server that hosts a text messaging service, or a server that hosts a social messaging service.

The messaging support node 5 can be a communication device such as a server computer system that includes hardware. The hardware can include a memory 5*a* and at least one transceiver unit 5*c* that are each communicatively connected to a processor 5*b*. The processor can be configured as a core processor, at least one microprocessor, a central processing unit, a group of interconnected processors linked in series or in parallel, or other type of hardware processor. The memory 5a may be a non-transitory memory such as flash memory, a hard drive, or other type of non-transitory computer readable medium storage unit. The transceiver unit 5c can include at least one receiver and at least one transmitter for establishing communications with different devices.

In some embodiments, the messaging support node 5 can also be configured to store data and retrieve data from at least one database or data store stored in its memory 5a and/or in the memory of a data store device 10 (shown in broken line in FIG. 1). The data store device 10 can be a communication device that hosts a database service or a data store service that is accessible via the network 3 or a communication connection such as a cloud based network connection or other type of communication connection. For instance, the data store device 10 can be a device that has hardware that includes non-transitory memory that stores data of the data store, a processor connected to the memory and a transceiver unit connected to the processor for establishing communications between the data store device 10 and other devices.

Each of the first and second communication terminals 1 and 7 can be an electronic communication device that includes hardware. The hardware of each of the first and second communication terminals 1 and 7 can include the elements shown in FIG. 2, for example. For instance, each of the communication terminals can have hardware that includes a processor 11, non-transitory memory 13, a transceiver unit 15 that can include at least one receiver and at least one transmitter, a first display unit 17 and at least one first input device 19. The processor 11 can be communicatively connected to the memory 13, transceiver unit 15, first display unit 17, and first input device 19.

The processor 11 of the communication terminal can also be communicatively connected to at least one other second input device 19a (shown in broken line in FIG. 2) such as a mouse, a stylus, a touch screen, or a keyboard that is a peripheral input device of the communication terminal. The processor can also be communicatively connected to a second display unit 17a (shown in broken line in FIG. 2) such as an external monitor, a television screen, or other type of display device. In some embodiments, the communication terminal may only include an external display unit and external input devices that are communicatively connected to the processor 11, such as a personal computer embodiment that has a monitor, a mouse, and a keyboard.

Figure 2:
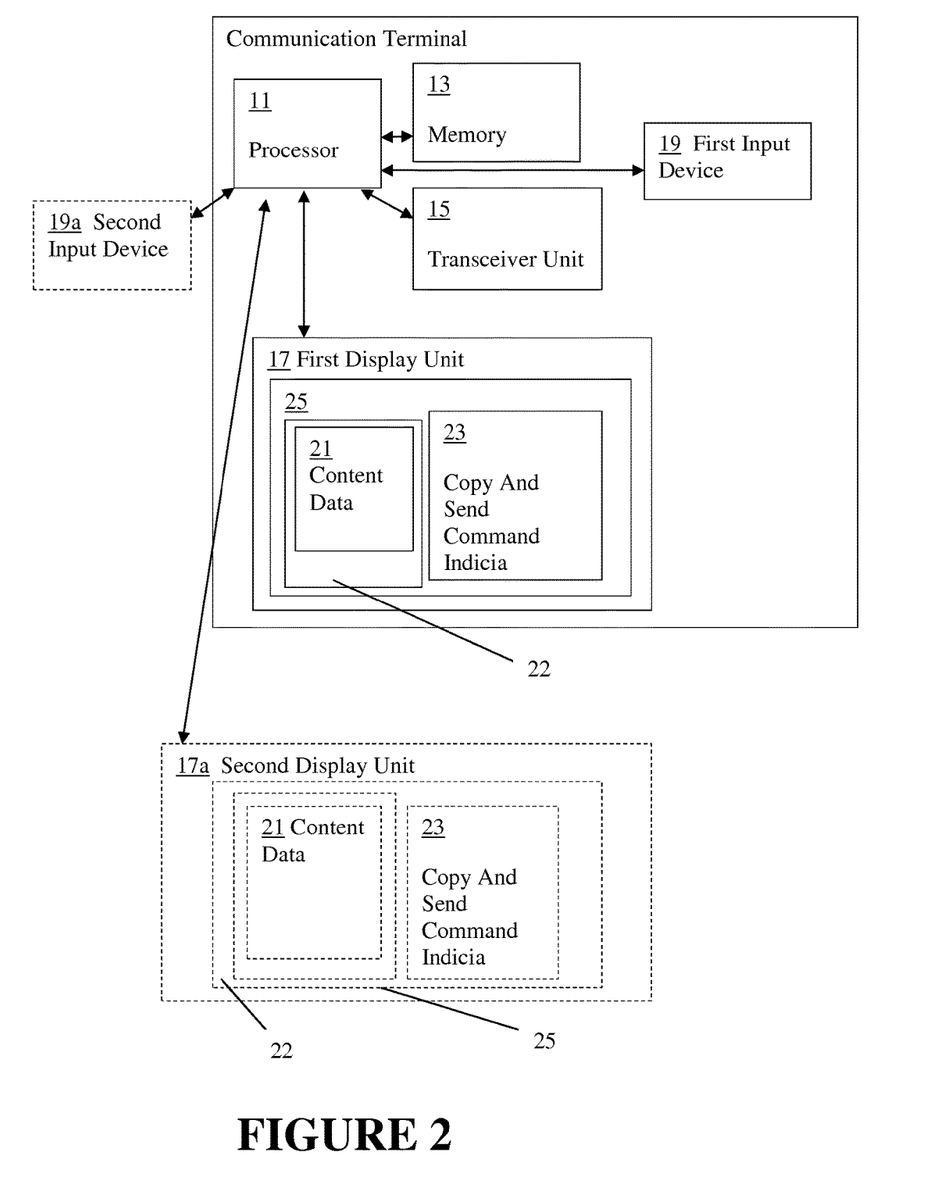
FIG. 2 is a block diagram illustrating a first exemplary embodiment of a communication terminal that may be utilized in the first exemplary embodiment of the communication system.

The processor 11 may be any type of hardware processor such as a microprocessor, a central processing unit, a plurality of interconnected processors, or other type of hardware processor unit. The memory 13 may be flash memory, a hard drive, or other type of non-transitory computer readable storage medium that is configured to store files, applications, and other data that can be used or executed by the processor 11 to cause the terminal to provide a type of function or service to a user. The first input device 19 can be a microphone, a camera, a touch screen, a button, key, keypad, or other type of input device. The first display unit 17 can be a liquid crystal display or other type of display that is connected to the housing of the terminal (e.g. the screen of a tablet or smartphone). In some embodiments, the first display unit 17 can be configured as a touch screen display so that it can function as an input/output device that is able to display output and receive input via a user's interaction with the screen.

The first and second communication terminals can each be configured to include an application that can be stored in the memory 13 of the terminal. The application can be executed by the processor 11 to provide a copy and send function for quickly sending messages that contain the content copied from a location in the memory of the terminal assigned to an open conversation for a messaging application stored in the terminal, a temporary storage location or other type of storage location in memory of the terminal. An open conversation for a messaging application may be, for example, a display of an exchange of one or more messages between different users that have occurred over a certain time period that are displayable via a graphical user interface associated with the messaging application of the terminals utilized to send and receive the exchanged messages (e.g. a history of exchanged text messages between a first address of a first terminal associated with a first user and a second address of a second terminal associated with a second user that are displayable on a display of each user's terminal via the graphical user interface of the text messaging application utilized for exchanging the messages, or an exchange of instant messages between a first address associated with a first user and a second address associated with a second user that are displayable on a display of each user's terminal via a graphical user interface of the instant messaging application utilized for exchanging the messages).

Figure 3:
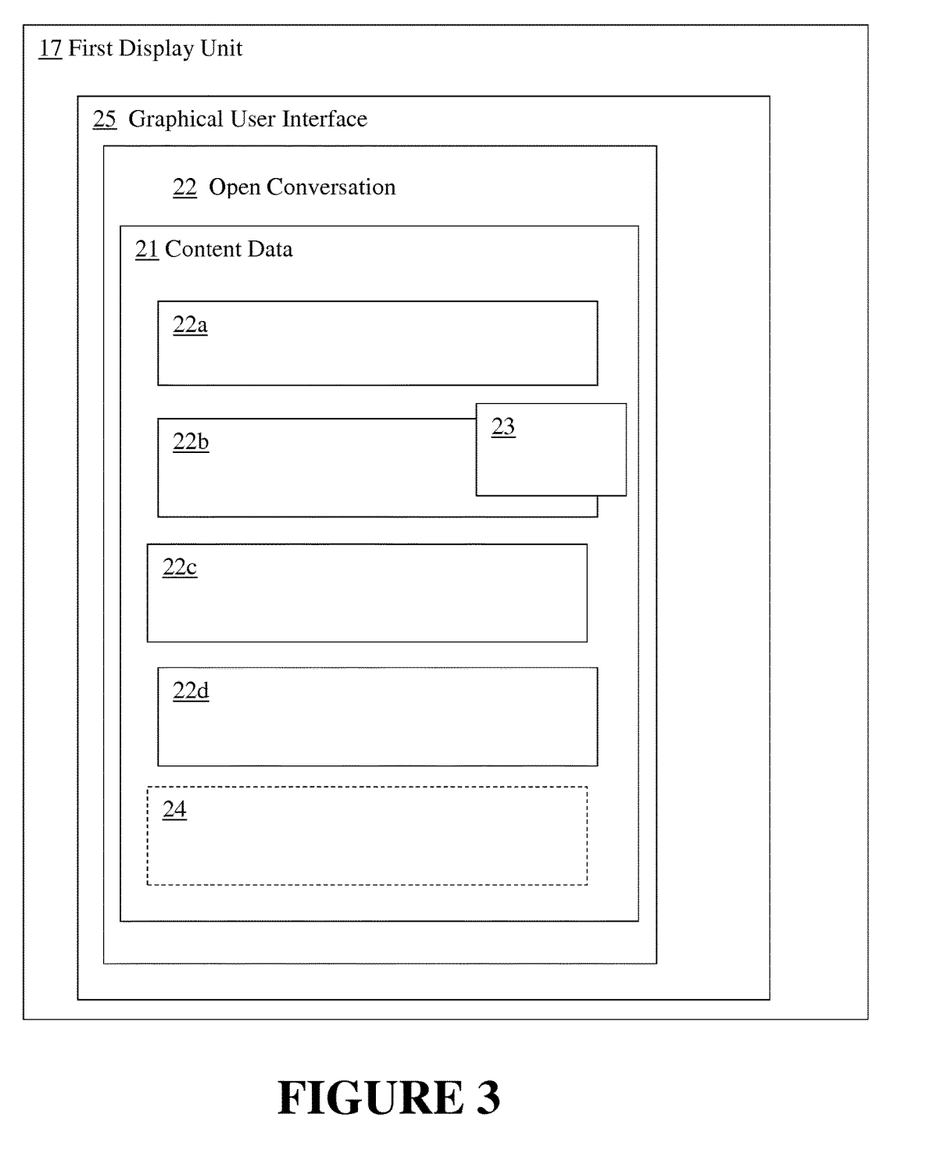
FIG. 3 is a block diagram illustrating a first exemplary embodiment of a display unit of a communication terminal displaying an exemplary embodiment of a graphical user interface illustrating an open conversation.
Figure 4:
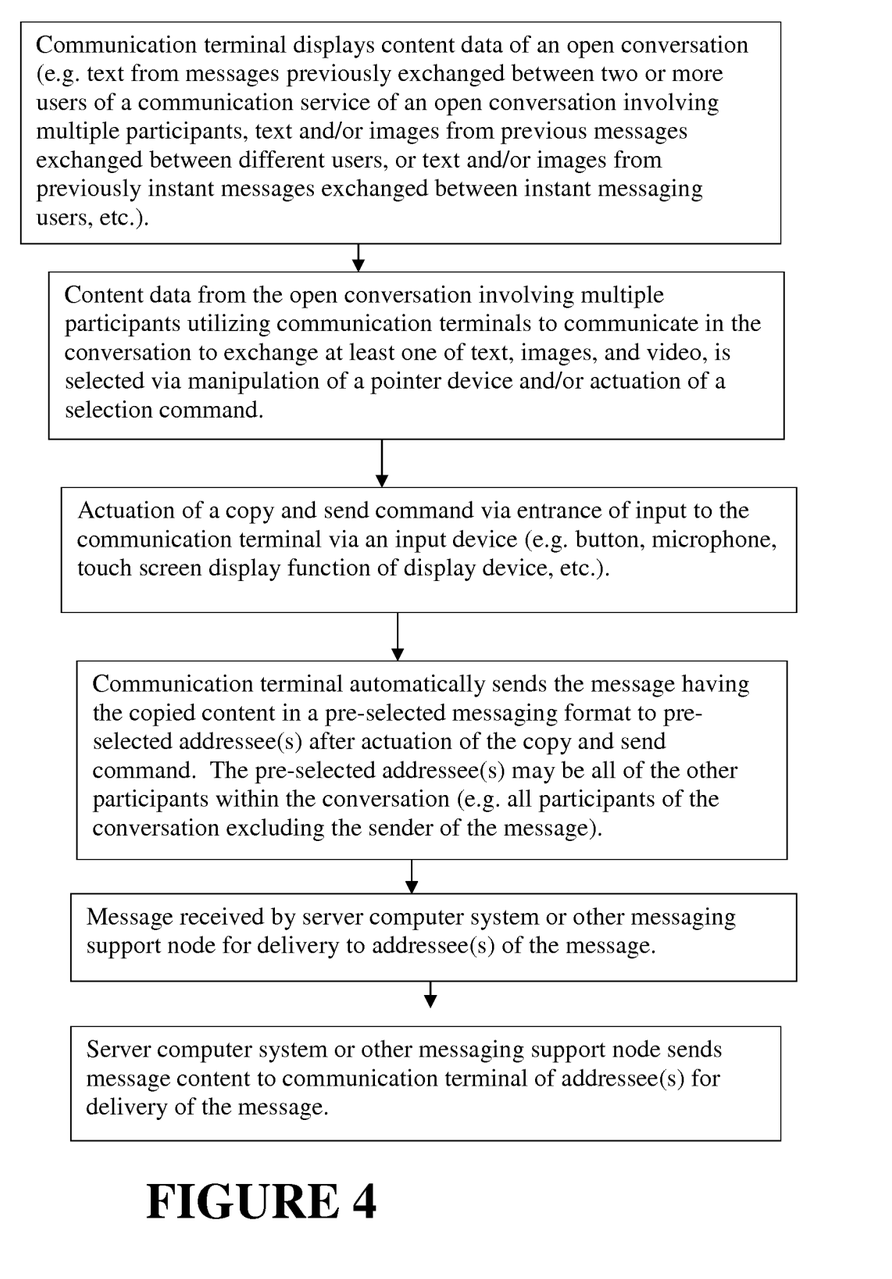
FIG. 4 is a flow chart illustrating a first exemplary method that may be implemented via the first exemplary embodiment of the communication terminal and/or the first exemplary embodiment of the communication system.

For instance, a user of a the first communication terminal 1 can view content data 21 on a first display unit 17 or second display unit 17a and select that content by manipulation of a pointer (e.g. touching a touch screen display, using a click and drag motion with a mouse, etc.) and thereafter actuate a copy and send command. In some embodiments, the copy and send command may be displayed for actuation in response to the selection of the content within a pop up window display, hover window display, or other window or indicia to be displayed in response to selection of content that includes indicia 23 that is selectable or otherwise actuatable to actuate the copy and send command. In some embodiments, the indicia that is actuatable to provide input for effecting the copy and send command can be indicia that is displayed in the graphical user interface 25 after a user has navigated a menu option or provided other input to actuate such a command.

Upon actuation of the copy and send command, a message in a pre-selected messaging format, such as a text message format, instant messaging format, or social messaging format, can be generated and thereafter sent automatically without any further input being provided by the user to the communication terminal. The selection of the addressee(s) for the message can be configured such that the selected addressee(s) of the message is automatically generated based on a pre-selection rule.

For instance, the addressee(s) of the message can be one or more participants of the open conversation 22 from which the content data is copied. The open conversation can include a plurality of messages that include a first message 22a, a second message 22b, a third message 22c, and a fourth message 22d that were previously exchanged in sequential order by the participants of the open conversation 22. Content from one of these messages, such as second message 22b within the conversation can be selected and the copy and send command could thereafter be actuated via selectable indicia 23 that is displayed after the selection of the content data is made. In response to actuation of the copy and send command via selectable indicia 23, a new fifth message 24, which is shown in broken line in FIG. 3, can be sent that includes the copied content data and is automatically sent to the other participant(s) of the open conversation 22. The new fifth message 24 can be appended as the latest message exchanged in the open conversation and can be displayed below the fourth message 22d in the display of the open conversation 22 shown via the graphical user interface 25 of the terminal that sends the fifth message. The new fifth message may traverse communication path 8 to be delivered to at least one second communication terminal 7 of at least one participant to the open conversation as shown in FIG. 1. Upon receipt of that message by each communication terminal for each of the one or more other conversation participants, the display for those participants' open conversation 22 generated on the graphical user interfaces displayed by their communication terminals may also show the fifth message 24 appended to the end of the open conversation to indicate that message is the most recently exchanged message within the open conversation 22.

The transport of the fifth message 24 may traverse the network 3 to each addressee's communication terminal as can be appreciated from FIG. 1. For instance, after actuation of the copy and send command, the new message having the copied content can be sent to the messaging support node 5 for delivery to the one or more addressees. For example, in some embodiments, the addressee of the message may be a user of the second communication terminal 7 where the open conversation is between two different users—the users of the first and second communication terminals 1 and 7. In other embodiments, the addressees may be multiple other users of multiple other second communication terminals that may also be participants in an open conversation involving those participants and the user of the first communication terminal 1.

The messaging support node 5 may then forward the message to the second communication terminal 7 of the addressee to deliver the message as well as forwarding the message on to other communication terminals of other addressees that may be listed as addressees of the message. In some embodiments, the messaging support node 5 may only forward or otherwise deliver the message to each communication terminal of each addressee of the message after that communication terminal has requested delivery of messages addressed to the user of that communication terminal to the communication terminal from the messaging support node 5 and provided acceptable authentications associated with the use of the messaging service by the user of the communication terminal (e.g. password data or other authentication data). The message may pass from the messaging support node 5 to the second access point 6 before being delivered to the second communication terminal 7. The user of the second communication terminal 7 that receives the new message as well as other users of other communication terminals that may also receive the message as other participants to the open conversation 22 may manipulate their communication terminal to view the content of the message as a text message, email message, or other type of message in the pre-selected format on the display unit of their communication terminal.

The user of the second communication terminal 7 could also send a message to the user of the first communication terminal along communication path 9 shown in FIG. 1 via a copy and send command. Such a message may also be sent to other users of other communication terminals who are participants in an open conversation.

For instance, the user of a the second communication terminal 7 can view content data 21 on a first display unit 17 or second display unit 17a and select that content by manipulation of a pointer (e.g. touching a touch screen display, using a click and drag motion with a mouse, etc.) and thereafter actuate a copy and send command. In some embodiments, the copy and send command may be displayed for actuation in response to the selection of the content within a pop up window display to be displayed in response to selection of content or may be indicia that is actuatable after a user has navigated a menu option or provided other input to actuate such a command.

Upon actuation of the copy and send command, a message in a pre-selected messaging format, such as a text message format, instant message format or social messaging format, can be generated and thereafter automatically sent without any further input being provided by the user of the second communication terminal 7. The one or more addressees for the message may be defined by a pre-selection rule such that each addressee of the message is pre-selected. For instance, all participants to an open conversation from which the content data is copied can be pre-selected as the addressees of the message. In some embodiments, the message may be sent to traverse communication path 9 for delivery to the addressee(s) of the message.

For instance, after actuation of the copy and send command, the message having the copied content can be sent to the messaging support node 5 for delivery to the one or more addressees. For instance, an addressee of the message may be a user of the first communication terminal 1. The messaging support node 5 may then forward the message to the first communication terminal 1 to deliver the message. In some embodiments, the messaging support node 5 may only forward or otherwise deliver the message to the first communication terminal after that communication terminal has requested delivery of messages addressed to the user of the first communication terminal from the messaging support node 5 to the first communication terminal 1 and provided acceptable authentications associated with the user of the first communication terminal (e.g. password data or other authentication data). When being delivered or forwarded by the messaging support node 5, the message may pass from the messaging support node 5 to the first access point 4 before being delivered to the first communication terminal 1. A user may manipulate the first communication terminal 1 to view the content of the message sent from the second communication terminal 7 as a text message, social messaging service message, instant message, or other type of message in the pre-selected format on a display unit of the first communication terminal 1.

For open conversations in which more than just the users of the first and second communication terminals are participants, the message may also be sendable from the messaging support node 5 to other communication terminals of other addressees of the message who were participants of the open conversation and were not the sender of that message. The other addresses of the message may receive the message similarly to how the user of the first communication terminal 1 received the message sent from the second communication terminal 7.

It is contemplated that the messaging format and addressee(s) of the messaging when utilizing the copy and send command can be configured such that a message is automatically sent to a pre-selected addressee or group of preselected addresses upon actuation of the copy and send command after input identifying the content to be copied is provided. For instance, in some embodiments, a communication terminal can be configured such that a user may provide input for selecting content and thereafter actuate the copy and send command. In respond to the actuation of the copy and send command, the first communication terminal may automatically send a message having the copied content in a pre-selected format to the pre-identified addressee(s).

The automatically sent message may be sent to the messaging support node 5 for delivery to the addressee(s) as discussed herein.

In some embodiments, the pre-selection of the messaging format and addressee of the message to be automatically sent via the copy and send command can be configured to depend on the application the user is using when selecting the content to be copied and sent. For instance, the content data 21 can be content data displayed on a user interface display 25 of a messaging application run by the communication terminal, such as an email graphical user interface, instant messaging graphical user interface, social messaging graphical user interface, or a text messaging graphical user interface. The text, image, and/or other content being selected within the graphical user interface of that particular application can be configured so that the message format selected for the copy and send command is in the messaging format of that application (e.g. text message when the text or other content is copied from a text message graphical user interface displaying an open conversation of previously exchanged text messages, instant message when the text or other content is copied from an instant message graphical user interface displaying an open conversation of previously exchanged instant messages, email message format when the text or other content is copied from email conversation content via an email graphical user interface). The addressee(s) of the message generated by the copy and send command can also be configured to be automatically populated based on the view of the graphical user interface display 25 displaying the open conversation 22 having the content being copied. For instance, if the selected content to be copied is within a displayed conversation or text messaging history between different users, then the addressee(s) for the message generated by the copy and send command can be automatically populated with the addressee(s) associated with that conversation who are not the sender of the message.

For instance, if first and second users have exchanged text messages, instant messages, or social messaging messages in the past, the graphical user interface may display these previously exchanged messages between those users in graphical user interface display 25. The history of previously exchanged messages may be viewed as an open conversation 22 in some embodiments. When content from a portion of that prior message exchange history is selected by the first user and the copy and send command is subsequently actuated by the first user using his or her first communication terminal 1, the addressee of the message generated by the actuation of that command can be the second user at the address associated with the second user in the message history (e.g. a phone number of the second communication terminal or other address of the second user or associated with the second user). The generated message 24 may be sent to the second user's address automatically after actuation of the copy and send command so that no further user input is needed to actuate the sending of the message and no further input is provided for editing or otherwise manipulating the message prior to the message being sent.

The first communication terminal 1 and/or second communication terminal 7 can also be configured so that a user may adjust settings applicable to the copy and send command to select automatic generation of the message based on a pre-selected messaging format and/or automatic sending in that pre-selected messaging format upon actuation of the copy and send command as well. Such settings may be saved in the memory 13 of the terminal. The settings may also be adjustable by the user via the user providing input to alter the pre-selected messaging format parameter and/or automatic sending parameter. For example, a sending parameter can be set such that a format for each message generated from use of the copy and send command is a format that is based on the application from which the content is copied (e.g. use instant message format when content to be copied and sent is copied from instant message content displayed in the instant messaging graphical user interface, use text message format when content is copied from a text messaging application graphical user interface, etc.). The user can provide input via an input device 19 of the communication terminal to adjust the settings and have them saved in the memory 13 of the communication terminal.

It should be appreciated that different embodiments of the innovation can be configured in different ways to meet a particular set of design criteria. For instance, multiple different types of communication terminals can be utilized in embodiments of the system. As another example, embodiments of the network may include multiple network nodes to facilitate transportation of a message sent from one terminal to the messaging support node and, thereafter, to a terminal device associated with the recipient of the message. As another example, the messaging support node can be configured to deliver a message addressed to a recipient after the terminal device of that recipient has requested messages addressed to that recipient be delivered to that terminal or the messaging support node can be configured to always just forward the message to the address of the addressee as indicated by the addressee of the message. As yet another example, embodiments of the network 3 can be configured as a corporate enterprise network, a local area network, a wireless local area network, a wide area network, or other type of network. In some embodiments, the network may also include the internet. Embodiments of the network 3 may also include gateway devices or other types of network nodes.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A communication apparatus, comprising:
 a first communication device having hardware, the hardware comprising at least one processor communicatively connected to non-transitory memory;
 content data in a message within a series of messages exchanged between users of a communication service displayed in a graphical user interface that is displayed on a display unit in response to receipt of input to effect selection of the content data being selectable via the first communication device;
 a generated message in a pre-selected messaging format having the selected content data copied within the message in response to actuation of a copy and send command being generatable by the first communication device; and
 the generated message in the pre-selected messaging format being automatically sendable by the first communication device such that, after actuation of the copy and send command, no further user input is needed to actuate generation and sending of the generated message prior to the generated message being sent by the first communication device.

2. The communication apparatus of claim 1, wherein the generated message is generated such that the generated message is automatically addressed to a pre-selected addressee in response to actuation of the copy and send command.

3. The communication apparatus of claim 2, wherein the pre-selected messaging format of the generated message is defined by the graphical user interface from which the content data is selected and the selected content data is an entirety of content in the generated message.

4. The communication apparatus of claim 3, wherein the pre-selected addressee for the generated message is an address of at least one user associated with an open conversation display within the graphical user interface displaying the selected content data.

5. The communication apparatus of claim 4, wherein the content data comprises at least one of text and graphical data.

6. The communication apparatus of claim 1, comprising:
a messaging support node communicatively connectable to the first communication device such that the generated message is deliverable to a communication terminal associated with an addressee of the message via the messaging support node.

7. The communication apparatus of claim 6, comprising:
the communication terminal communicatively connectable to the messaging support node so that authentication data is sendable to the messaging support node.

8. The communication apparatus of claim 7, wherein the generated message is sendable from the messaging support node to the communication terminal after the messaging support node receives the authentication data and verifies that the authentication data associates the communication terminal with the addressee of the message.

9. A non-transitory computer readable medium having code stored thereon, the code defining a method of quickly sending at least one message that is performable by a communication terminal that runs the code, the method comprising:
selecting content data in a message within a series of messages exchanged between users of a communication service displayed in a graphical user interface that is displayed on a display unit in response to selection input;
actuating a copy and send command after in response to receipt of a copy and send command input after the selecting of the content data occurs;
generating, by the communication terminal, a generated message in a pre-selected messaging format having the content data copied within the generated message in response to actuation of the copy and send command; and
automatically sending, by the communication terminal, the generated message after actuation of the copy and send command such that no further user input is needed to actuate the sending of the generated message and such that no further input is providable for editing the generated message prior to the generated message being sent.

10. The non-transitory computer readable medium of claim 9, wherein the pre-selected messaging format of the generated message is defined by the graphical user interface from which the content data is selected and the selected content data is an entirety of content in the generated message.

11. The non-transitory computer readable medium of claim 10, wherein the pre-selected addressee for the generated message is an address of at least one user associated with an open conversation display within the graphical user interface displaying the selected content data via the display unit.

12. The non-transitory computer readable medium of claim 11, wherein the content data comprises at least one of text and graphical data.

13. The non-transitory computer readable medium of claim 9, wherein the generated message is sent to a messaging support node for delivery to at least one addressee of the generated message.

14. The non-transitory computer readable medium of claim 9, wherein the generated message is generated such that the generated message is automatically addressed to a pre-selected addressee by the communication terminal in response to actuation of the copy and send command.

15. A communication terminal, comprising:
hardware, the hardware comprising a processor communicatively connected to non-transitory computer readable medium, the non-transitory computer readable medium having an application stored thereon that defines a copy and send command such that the communication terminal is configured to automatically generate a generated message and send the generated message having copied content within the generated message in response to actuation of the copy and send command that occurs while displayed content data is selected, the copied content within the generated message being a copy of the content data and the generated message being automatically sent such that no further user input is needed to actuate the sending of the message.

16. The communication terminal of claim 15, wherein the generated message is generated in a pre-selected messaging format for sending to a messaging support node for delivery of the generated message to at least one other communication terminal associated with at least one addressee of the generated message.

17. The communication terminal of claim 16, wherein the pre-selected messaging format of the message is defined by the graphical user interface from which the content data is selected; and
the generated message is automatically sendable in response to the actuation of the copy and send command such that no further input is providable for editing the generated message prior to the generated message being sent.

18. The communication terminal of claim 17, wherein the addressee of the generated message is a pre-selected addressee associated with an open conversation displayed within the graphical user interface displaying the selected content data.

19. The communication terminal of claim 15, wherein the copied content data is content data selected from content of a message within a series of messages exchanged between users of a communication service displayed in a graphical user interface that is displayed on a display unit.

20. The communication terminal of claim 19, wherein the display unit is a display unit of the communication terminal that is connected to the processor.

* * * * *